US007358628B2

(12) United States Patent
Yin

(10) Patent No.: US 7,358,628 B2
(45) Date of Patent: Apr. 15, 2008

(54) CONFIGURABLE CIRCUIT AND METHOD FOR DETECTING THE STATE OF A SWITCH

(75) Inventor: Rong Yin, Coppell, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 360 days.

(21) Appl. No.: 10/717,103

(22) Filed: Nov. 19, 2003

(65) Prior Publication Data

US 2004/0222702 A1 Nov. 11, 2004

Related U.S. Application Data

(60) Provisional application No. 60/469,325, filed on May 9, 2003.

(51) Int. Cl.
*G06F 13/40* (2006.01)

(52) U.S. Cl. ........................................ 307/134

(58) Field of Classification Search ............... 307/134; 340/635
See application file for complete search history.

(56) References Cited

U.S. PATENT DOCUMENTS 5,275,158 A * 1/1994 Lopin ........................... 607/6
6,861,955 B2 * 3/2005 Youssef ...................... 340/635
2004/0051643 A1 * 3/2004 Bullmore .................... 340/635

* cited by examiner

*Primary Examiner*—Michael Sherry
*Assistant Examiner*—Carlos Amaya
(74) *Attorney, Agent, or Firm*—Lisa K. Jorgenson; Andre M. Szuwalski

(57) ABSTRACT

A circuit and method are disclosed for monitoring the state of at least one switch. The circuit may include a first circuit, coupled to a switch, for detecting whether the switch is in one of a closed state and an open state and generating a signal having a value based upon the detection. The circuit may further include a second circuit, coupled to the first circuit, for configuring the first circuit to selectively detect the switch switching from a normally open state and to selectively detect the switch switching from a normally closed state.

21 Claims, 8 Drawing Sheets

CONFIGURABLE CIRCUIT AND METHOD FOR DETECTING THE STATE OF A SWITCH

CROSS REFERENCE TO RELATED APPLICATION

The present application claims priority from U.S. Provisional Application No. 60/469,325, filed May 9, 2003, the disclosure of which is hereby incorporated by reference.

The present application is related to U.S. patent application Ser. No. 10/147,639, filed May 17, 2002, which is incorporated by reference herein in its entirety.

BACKGROUND OF THE INVENTION

Techniques exist for monitoring the configuration of mechanical devices and detecting whether the mechanical devices have been tampered with or otherwise physically changed. For instance, existing security systems are known to electronically monitor the state of mechanical or magnetic switches disposed about a building or attached to a lockable storage container in order to determine whether such switches change from an open state to a closed state or vice versa in response to the building or container being tampered with. In many instances, such security systems are not implemented in an efficient or reliable manner. Some existing security systems are bulky and consume a relatively sizeable amount of power. Further, circuitry of the security system are relatively rigid and are not adaptable to different security system applications.

What is needed, then, is a circuit and method for reliably detecting the state of a device, such as a mechanical switch, that may be simply and inexpensively implemented and is adapted for use in a number of different applications.

SUMMARY OF THE PRESENT INVENTION

Exemplary embodiments of the present invention overcome the above-described shortcomings in existing tamper detection circuits and satisfy a significant need for a detection circuit that may accommodate any of a number of different applications. According to an exemplary embodiment of the present invention, a detection circuit may be configured into any of a number of different switch detection configurations. For example, the detection circuit may be configured to be in a normally-closed-tamper-to-high configuration, a normally-closed-tamper-to-low configuration, a normally-open-tamper-to-high configuration and a normally-open-tamper-to-low configuration.

The normally-closed-tamper-to-high configuration is one in which the switch is normally in the closed state and opens when a tamper event occurs such that one of its conduction terminals is pulled to a voltage representing the logic high state by the detection circuit. The normally-closed-tamper-to-low configuration is one in which the switch is normally in the closed state and opens when a tamper event occurs such that one of its conduction terminals is pulled to a voltage representing the logic low state by the detection circuit. The normally-open-tamper-to-high configuration is one in which the switch is normally in the open state and closes when a tamper event occurs such that one of its conduction terminals is pulled to a voltage representing the logic high state by the detection circuit. The normally-open-tamper-to-low configuration is one in which the switch is normally in the open state and closes when a tamper event occurs such that one of its conduction terminals is pulled to a voltage representing the logic low state by the detection circuit.

Specifically, the detection circuit may be configurable to selectively pull (or attempt to pull) a first conduction terminal of the switch towards a voltage level representative of a logic high state and to selectively pull (or attempt to pull) the first conduction terminal of the switch towards a voltage level representative of a logic low state, while the switch is in its normal state. In the event the detection circuit is configured in one of the normally open states and the switch closes, such as due to the occurrence of a tamper event, the detection circuit detects the switch changing state and stops pulling the first conduction terminal of the switch. In the event the detection circuit is configured in one of the normally closed states, the detection circuit may at least occasionally pull (or attempts to pull) the first conduction terminal of the switch towards a voltage level representative of a selected logic state. In this way, there is no continuous current path through the detection circuit and the switch.

An operation of the detection circuit may include configuring the detection circuit to select whether the circuit is to detect a switch switching from a normally open state or from a normally closed state, and to select whether the detection circuit pulls the first terminal of the switch towards a voltage representative of a logic high value or a logic low value during the time the switch is in its normal state. Following the detection circuit detecting the switch switching from the selected normal state, the detection circuit generates an output signal having a value indicative of the detection.

BRIEF DESCRIPTION OF THE DRAWINGS

A more complete understanding of the method and apparatus of the present invention may be acquired by reference to the following Detailed Description when taken in conjunction with the accompanying Drawings wherein.

DESCRIPTION OF EXEMPLARY EMBODIMENTS OF THE INVENTION

The present invention will now be described more fully hereinafter with reference to the accompanying drawings in which exemplary embodiments of the invention are shown. This invention may, however, be embodied in many different forms and should not be construed as being limited to the embodiments set forth herein. Rather, the embodiments are provided so that this disclosure will be thorough and complete, and will fully convey the scope of the invention to those skilled in the art.

Embodiments of the invention may include detection circuitry for monitoring one or more switches. The exemplary embodiment of the present invention described hereinbelow is a circuit for monitoring the state of two switches.

The circuitry for monitoring one switch may be the same as the circuitry for monitoring the other switch.

The detection circuitry may include circuitry for selecting one of the detection configurations. When a configuration is selected, circuitry dedicated to the unselected configurations may be disabled and decoupled from the switch. A configuration register (not shown), for example, may store data which is used to perform the selection. In this way, the configuration may be set in a volatile manner.

Figure 1A:
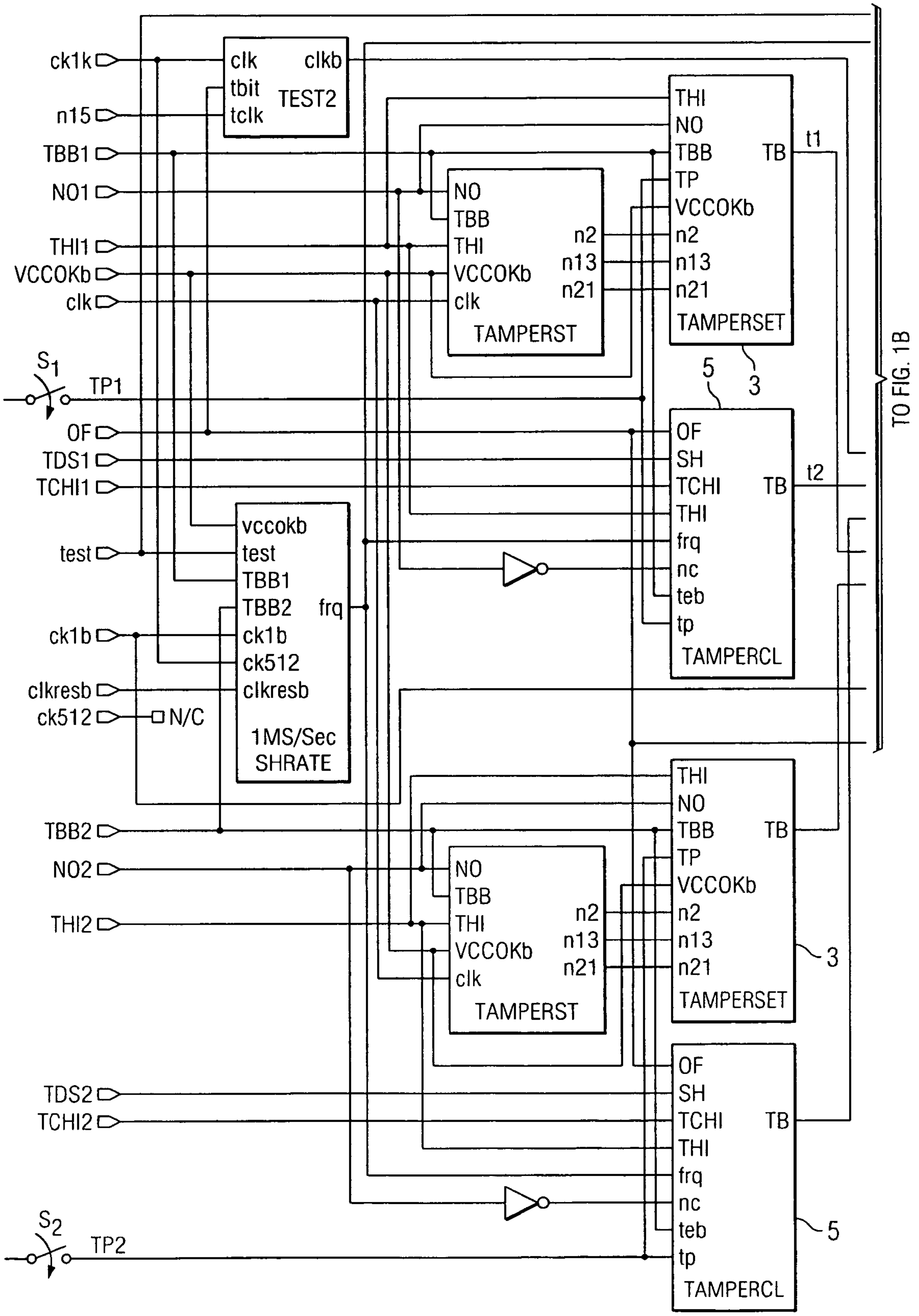
FIGS. 1A and 1B are a block diagram of circuitry for monitoring the state of two switches.
Figure 1B:
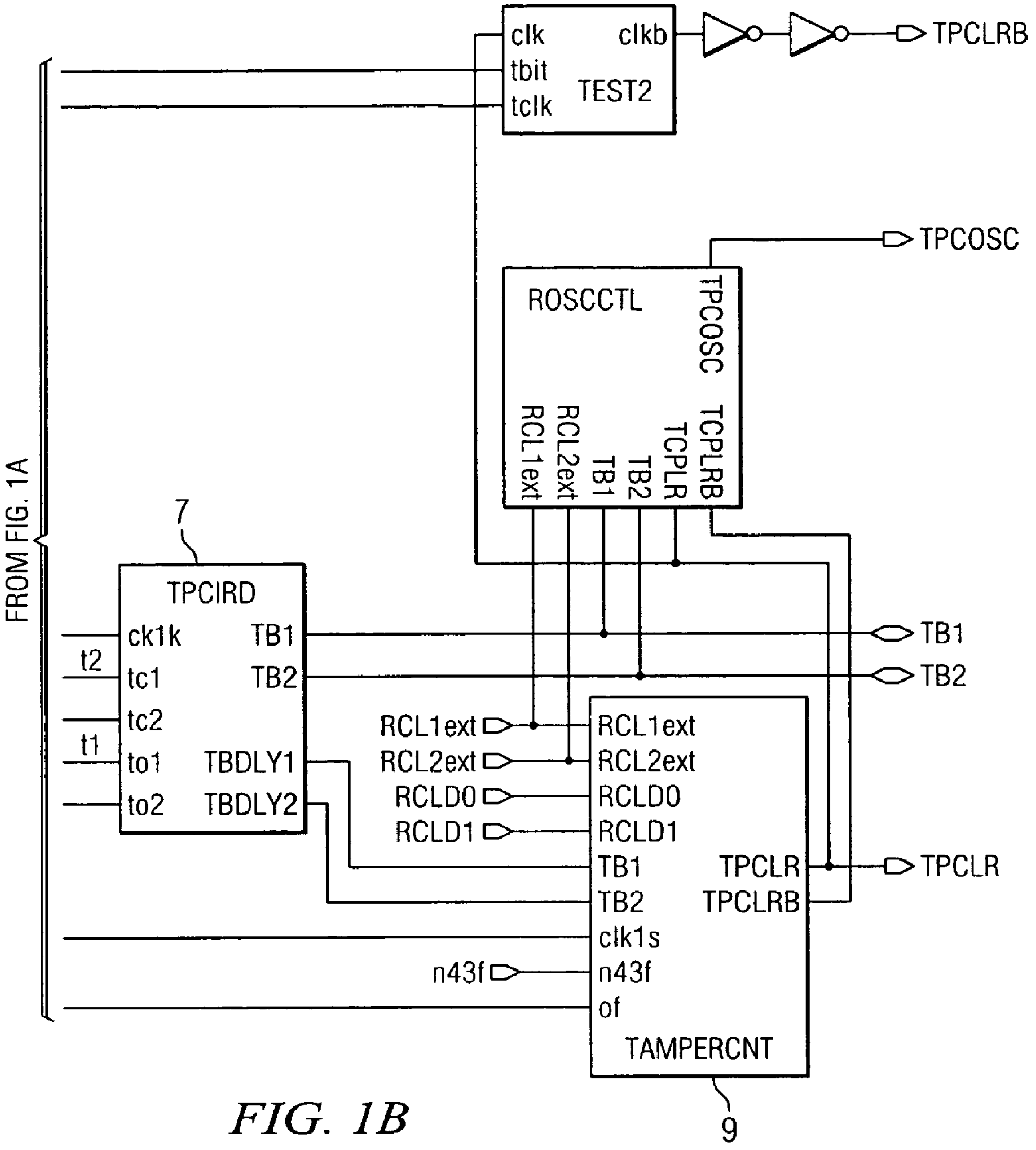

FIGS. 1A and 1B illustrate a block diagram of the detection circuitry associated with two switches S1 and S2. Switches S1 and S2 may be of virtually any switch type, and are depicted in symbolic form for reasons of simplicity. Each switch S1 and S2 has a conduction terminal coupled to detection circuitry. A conduction terminal of switch S1 is coupled to node TP1 of detection circuitry, and a conduction terminal of switch S2 is coupled to node TP2. The configuration register (not shown) may provide many of the input signals to detection circuitry.

Normally open circuits 3 monitor the two switches S1 and S2 when detection circuitry is configured in the normally-open tamper configuration. In particular, each of the blocks 3 is used to monitor a distinct switch S1 or S2 when detection circuitry is configured in either the normally-open-tamper-to-high configuration or the normally-open-tamper-to-low configuration.

Detection circuitry further includes normally closed circuits 5, each of which is to adapted to monitor a distinct switch S1 or S2 when detection circuitry is configured in one of the normally-closed tamper configurations. Normally closed circuits 5, when enabled, are capable of monitoring switches S1 and S2 when detection circuitry is configured in either the normally-closed-tamper-to-low or normally-closed-tamper-to-high configurations. Output circuits 7 receive the outputs of each normally open circuit 3 and normally closed circuit 5 and generates a pair of output signals TB1 and TB2 having values representative of switch S1 and S2, respectively, changing state.

Figure 2A:
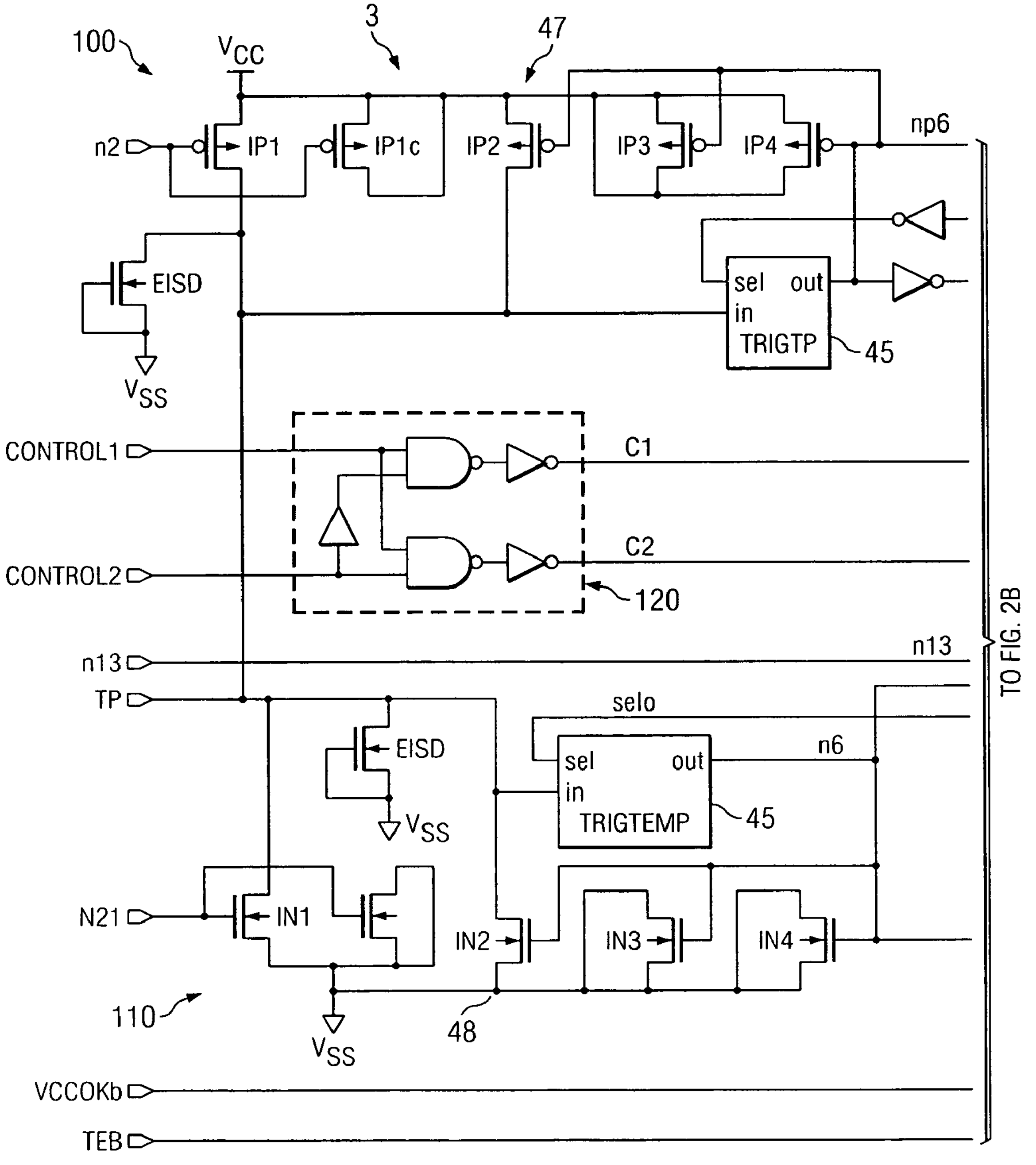
FIGS. 2A and 2B are a schematic of one or more blocks in the diagram of FIGS. 1A and 1B.
Figure 2B:
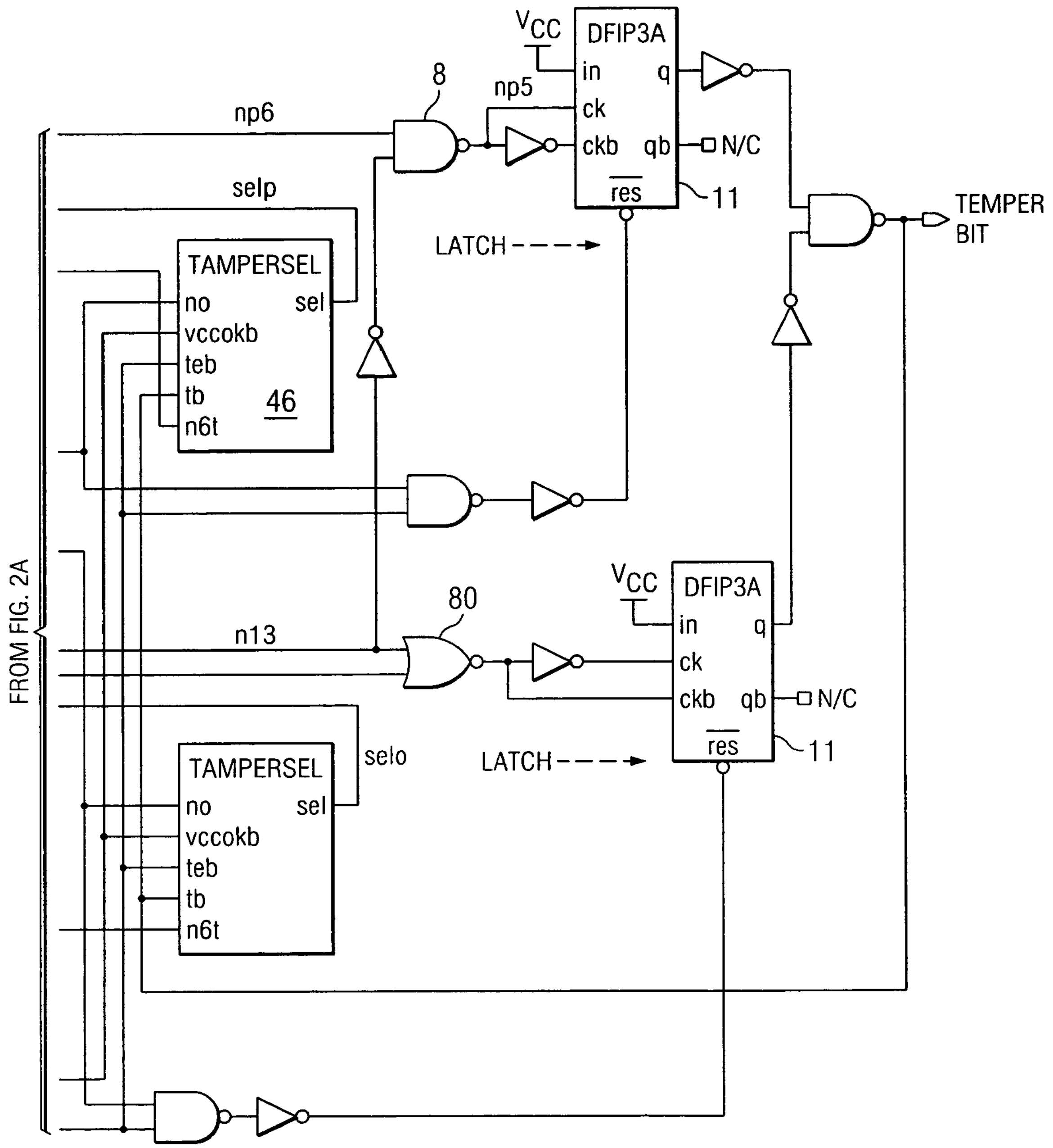

FIGS. 2A and 2B are is a diagram of a normally open circuit 3. Circuitry 100 in roughly the upper half of FIGS. 2A and 2B is the circuitry for monitoring the switch (S1 or S2) in the normally-open-tamper-to-low configuration, and the circuitry 110 in the lower half of FIGS. 2A and 2B is the circuitry for monitoring the switch in the normally-open-tamper-to-high configuration. Circuitry 120 is control logic for selectively configuring and/or enabling one of circuitry 100 and 110. In this way, the value of output signal TB is only based on the selected one of circuitry 100 and circuitry 110.

In FIGS. 2A and 2B, the input signal TP is coupled to a conduction terminal of a corresponding switch to be monitored.

Circuitry 100 may include a circuit 45 having an input coupled to node TP and capable of generating an output having a value based upon the voltage appearing on node TP. Specifically, circuit 45 may perform a logical inversion function with hysteresis between its input and output. Circuit 45 may include a select input to selectively eliminate the possibility of static current being drawn by circuit 45 in the event a relatively lower voltage appears on node TP and a terminal of switch S1.

Figure 5:
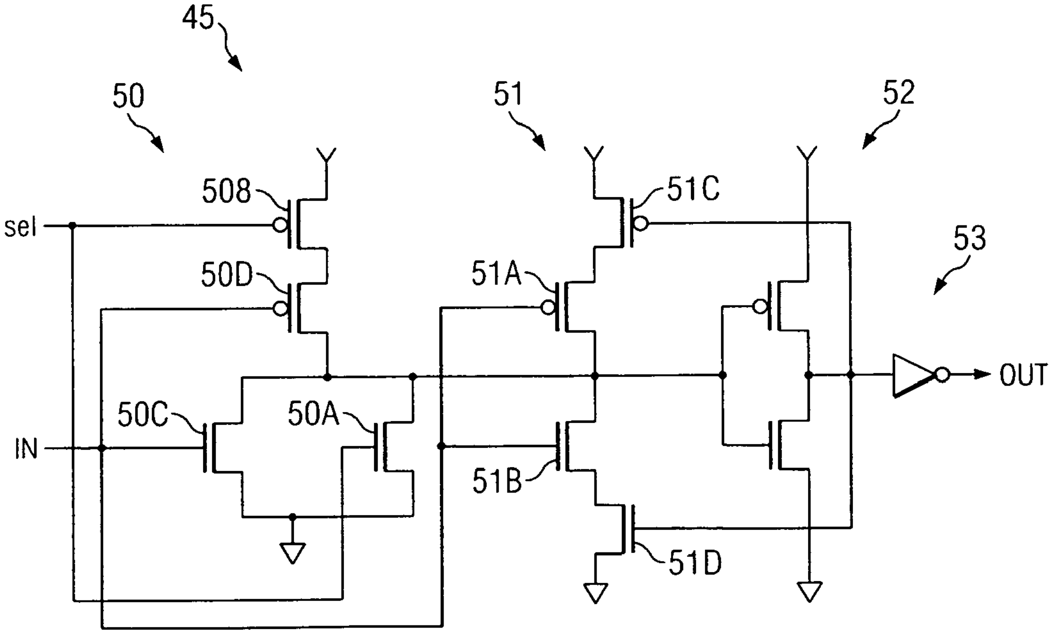

An implementation of circuit 45, according to an embodiment of the present invention, is shown in FIG. 5. As stated above, circuit 45 of FIG. 5 provides a hysteresis effect between input IN and output OUT. Circuit 45 may include a first stage 50, a second stage 51, a third stage 52 and a fourth stage 53. Transistors in first stage 50 may be configured to perform a logic NOR function between input IN and select input SEL. Second stage 51 may include four transistors 51A-51D series-connected to each other, with two p-channel transistors 51A and 51C and two n-channel transistors 51B and 51D. Input IN may be connected to the gate/control terminal of transistors 51A and 51B. The gate/control terminal of transistors 51C and 51D may be connected to the output of third stage 52. Third stage 52 and fourth stage 53 may each be logic inverters, with the input of third stage 52 being connected to input IN and the input of fourth stage 53 being connected to the output of third stage 52. The above-mentioned hysteresis effect is provided by employment of second stage 51 in circuit 45.

As can be seen, when select input SEL is at a logic low level, circuit 45 performs as a logic inverter with hysteresis in that output OUT is the logical inversion of input IN. However, when select input SEL is at a logic high level, the output of first stage 50 is pulled to the ground potential by transistor 50A and transistor 50B is turned off In this way, no static current flows in first stage 50 due to transistor 50B being turned off, even if input IN is at a voltage level to simultaneously activate/turn on transistors 50C and 50D. Output OUT is driven to a logic low level when select input SEL is at a logic high level. In this way, select input SEL may serve to disable circuit 45 from providing at output OUT the logical inversion of input IN. It is noted that static current is unable to flow in second stage 51 even if input IN is at a voltage level to simultaneously activate transistors 51A and 51B, due to only one of transistors 51C and 51D being activated at a time.

Circuitry 100 of normally open circuit 3 may further include a transistor 47 coupled between node TP and a high reference voltage and having a control/gate terminal coupled to the output of circuit 45. Transistor 47 may be sized to relatively weakly pull node TP (and hence the conduction terminal of switch S1) to the high reference voltage when activated. Transistor 47 serves to pull signal TP (and thus the conduction terminal of a switch S1 or S2) towards the high voltage reference when activated (i.e., when the switch remains normally open).

Circuitry 100 of normally open circuit 3 may further include flip flop circuit 11. Flip flop circuit 11 may be a D-type flip flop circuit (as shown in FIG. 2B), but it is understood that flip flop circuit 11 may be other types of flip flop circuits. A data input of flip flop circuit 11 may be coupled to a logic high level, and a reset input of flip flop circuit 11 may be coupled to enable circuitry. The clock input CK and the inverted clock input CKB may be coupled to the output of circuit 45 via logic NAND gate 8. In particular, flip flop circuit 11 will store a logic high value upon the output OUT of circuit 45 transitioning from a logic high level to a logic low level (i.e., a falling edge of output OUT of circuit 45).

Circuit 3 may further include a control circuit 46 that generates the control signal for driving the select input SEL of circuit 45. Control circuit 46 may generate the control signal based upon a number of signals/conditions of normally open circuit 3 and/or the device in which detection circuitry 1 is employed. For instance, the control signal generated by control circuit 46 may be based upon the output of flip flop circuit 11.

Figure 6:
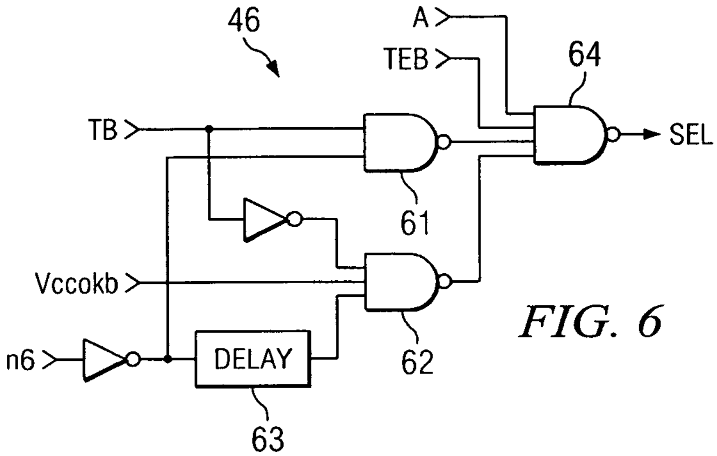
FIGS. 5 and 6 are schematics of sub-circuits shown in FIGS. 2A and 2B.

FIG. 6 illustrates a circuit implementation of control circuit 46 in accordance with an exemplary embodiment of the present invention. A logic NAND gate 61 may receive as inputs the output of flip flop circuit 11 (denoted by input TB) and the logical inversion of the output OUT of circuit 45 (denoted by input n6). Another logic NAND gate 62 may receive as inputs the logical inversion of the output of flip flop circuit 11, input signal Vccokb and a delayed, logical inversion of the output OUT of circuit 45. Delay circuit 63, which may provide at its output a delayed version of the signal appearing on its input, may be utilized to delay the signal appearing on output OUT of circuit 45 (n6) from being applied to logic NAND gate 62. A logic NAND gate 64 may receive enable signal TEB and the output of logic NAND gates 61 and 62, and generate output signal SEL which is applied to the select input SEL of circuit 45. As can be understood, the output SEL of control circuit 46 will be in a logic low state (to enable circuit 45 to provide at output OUT thereof the logical inversion of input IN of circuit 45) when enable signal TEB and the outputs of logic NAND gates 61 and 62 are all in the logic high state, and will otherwise be in a logic high state (to disable circuit 45 from providing at output OUT thereof the logical inversion of input IN of circuit 45 while substantially eliminating static current drawn by circuit 45).

Circuitry 110 may also include a circuit 45, control circuit (TAMPERSEL) 46 and flip flop circuit 11 connected to each other much as such circuits are connected to each other in circuitry 100. In addition, circuitry 110 may include logic NOR gate 80 coupled between circuitry 45 and flip flop circuit 11 of circuitry 110. An n-channel transistor 48 may be coupled between signal TP and the low voltage reference. The control terminal of transistor 48 is coupled to the output of circuit 45 of circuitry 110. Transistor 48 is sized to relatively weakly pull signal TP (and thus the conduction terminal of a switch S1 or S2) towards the low voltage reference when activated (i.e., when the switch remains normally open).

As stated above, circuit 120 serves to enable one or less circuits 100 and 110, based upon the desired configuration for detection circuitry. Input signal Control1 controls whether one of circuit 100 and 110 will be enabled to monitor the corresponding switch. Signal Control1 may be in a first (logic high, in this exemplary embodiment) state when detection circuitry is configured in a normally open configuration, and in a second (logic low) state when detection circuitry is configured in a normally closed state. Control signal Control2 selects the circuit 100 or 110 that is enabled for monitoring the corresponding switch. When signal Control2 is in a first (logic low) state, circuit 100 is enabled to monitor the corresponding switch and detection circuitry is thus configured in the normally-open-tamper-to-low state. Conversely, when signal Control2 is in a second (logic high) state, circuit 110 is enabled to monitor the corresponding switch and detection circuitry is thus configured in the normally-open-tamper-to-high state.

If circuitry 100 is enabled by circuitry 120 and signals Control1 and Control2 so that a normally-open-tamper-to-low configuration is configured, input signal TP (and hence the conduction terminal of one of the switches) is temporarily pulled to a voltage corresponding to a logic high value by temporary activation of a p-channel transistor 47. When the corresponding switch changes state from the open state to the closed state, input signal TP is pulled towards low reference voltage Vss, due to the other conduction terminal of the switch not coupled to input signal TP being coupled to Vss. The switch closing causes the output of circuit 45 to change from a logic low value to a logic high value, which causes flip flop element 11 to clock a logic high value, which thereafter causes output signal TB to change state.

The output of circuit 45 changing state also causes transistor 47 to be deactivated and the output of control circuit 46 to deselect circuit 45. Because circuitry 110 is disabled by circuit 120 during this time, flip-flop circuit 11 of circuit 120 remains in the reset state and thus allows output signal TB to follow the output of flip flop circuit 11 of circuit 100. Other circuitry, such as circuitry in output circuits 7 (FIG. 1B) to which output signal TB is coupled as an input may detect output signal TB changing logic state and generate a signal TB that initiates further action.

Conversely, if circuitry 110 is enabled by circuitry 120 and signals Control1 and Control2 so that a normally-open-tamper-to-high configuration is configured, input signal TP is temporarily pulled to a voltage corresponding to a logic low value by temporary activation of an n-channel transistor 48. When the corresponding switch changes state from the open state to the closed state, input signal TP is pulled towards high reference voltage Vcc, due to the other conduction terminal of the switch not coupled to input signal TP being coupled to high reference Vcc and to transistor 48 having a lesser drive strength. The output of circuit 45 of circuit 110 changing from a logic high value to a logic low value also causes flip flop circuit 11 of circuit 110 to clock a logic high value, which thereafter causes output signal TB to change state.

The output of circuit 45 of circuit 110 changing state also causes transistor 48 to be deactivated and the output of control circuit 46 of circuit 110 to deselect circuit 45. Because circuitry 100 is disabled by circuitry 120 during this time, flip flop circuit 11 of circuit 100 remains in the reset state and thus allows output signal TB to follow the output of flip flop circuit 11 of circuit 110. Output circuits 7 may cause signal TB to transition to a data value that initiates further action.

Figure 3A:
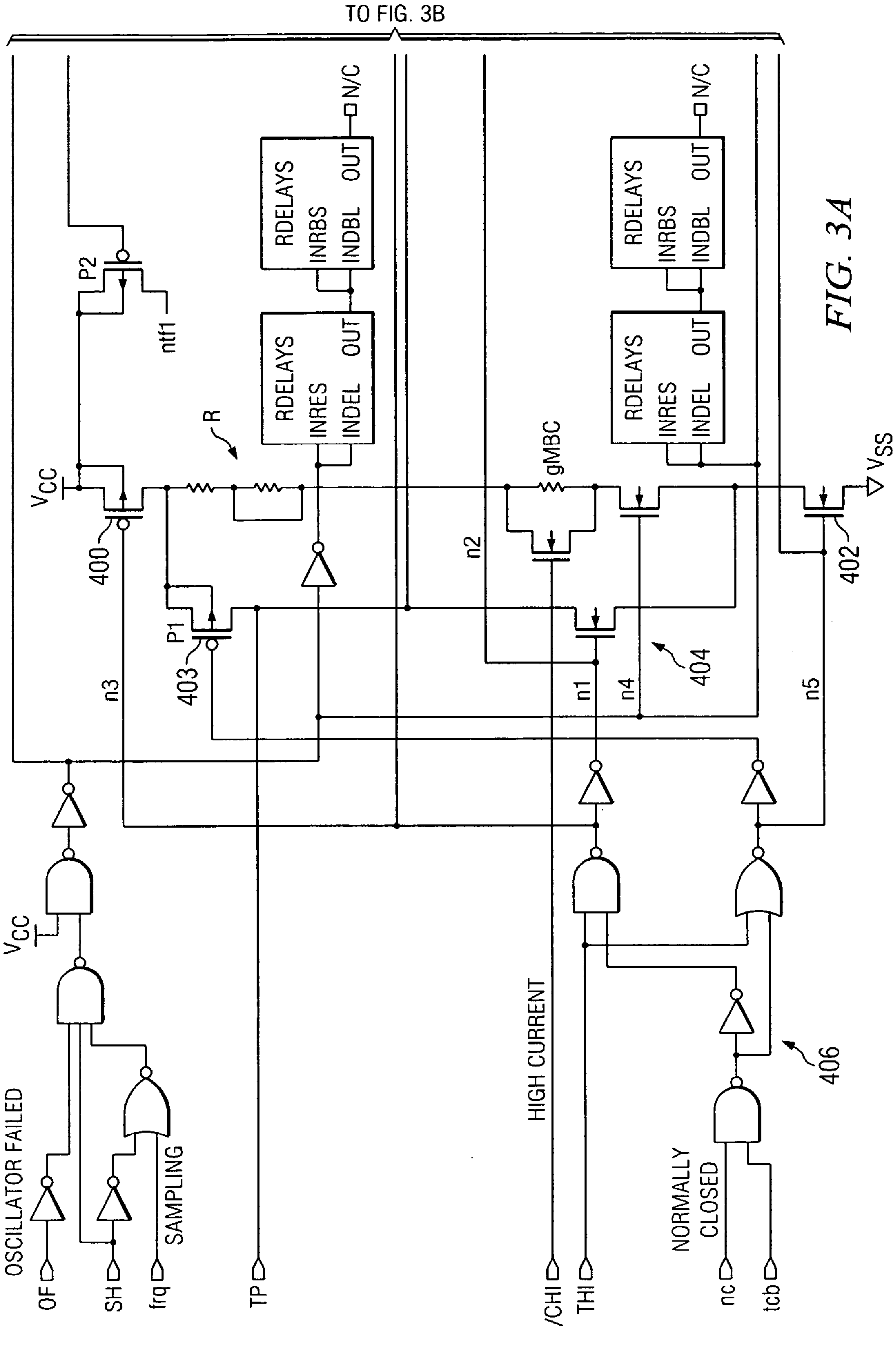
FIGS. 3A and 3B are a schematic of one or more other blocks in the diagram of 1A and 1B.

FIGS. 3A and B are a schematic diagram for each of the normally closed circuits 5 appearing in FIGS. 1A and 1B. Each normally closed circuit 5 may include a string of series-connected resistors and a plurality of pass gate transistors coupled thereto that may be controlled (i.e., activated or deactivated) for configuring detection circuitry to be one of the normally-closed-tamper-to-high and normally-closed-tamper-to-low configurations. The normally closed circuit 5 receives input signal TP which is coupled to a conduction terminal of the switch being monitored.

Figure 3B:
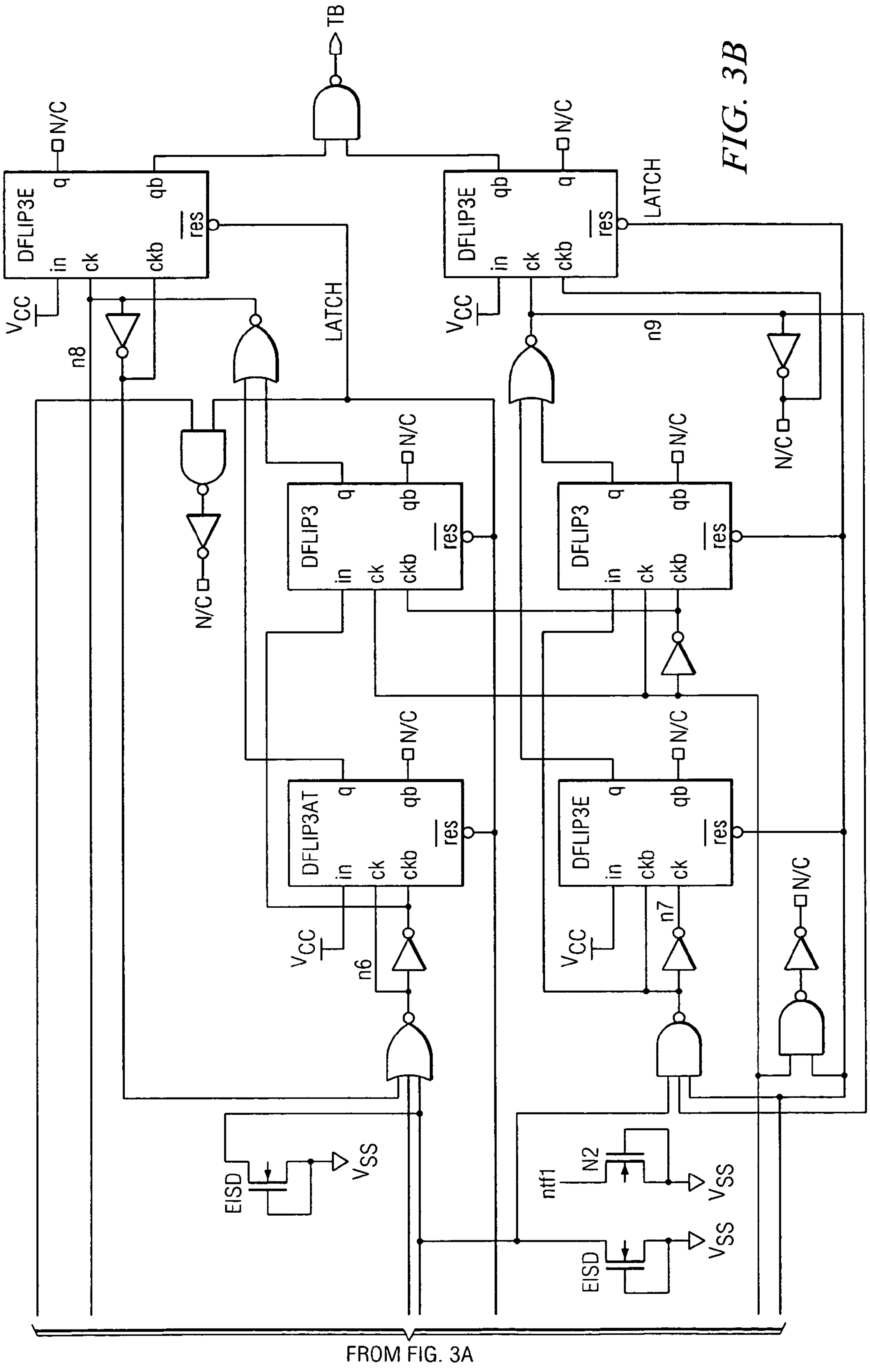
Figure 4:
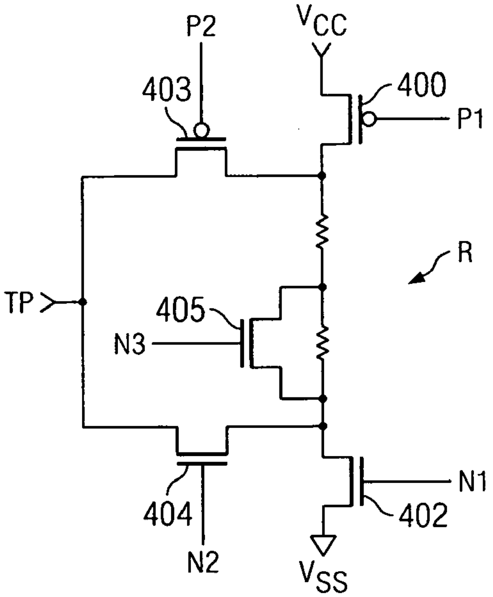
FIG. 4 is a simplified schematic of a portion of the schematic of FIGS. 3A and 3B.

FIG. 4 illustrates a simplified schematic of the resistor-pass gate transistor circuitry normally closed circuit 5 of FIGS. 3A and 3B for configuring the detection circuitry to be in one of the normally-closed-tamper-to-high and normally-closed-tamper-to-low configurations. The simplified schematic of FIG. 4 shows a resistor R, which may be formed from a plurality of series-connected resistors; transistor 400 coupled between the high reference voltage Vcc and resistor R; transistor 402 coupled between the low reference voltage Vss and resistor R; transistor 403 coupled between input signal TP and the node coupling transistor 400 to resistor R; and transistor 404 coupled between input signal TP and the node coupling transistor 402 to resistor R. The control terminal of each transistor 400-402 is coupled to control signals.

When the detection circuitry is configured in the normally-closed-tamper-to-high configuration, transistors 400 and 404 are activated and transistors 402 and 403 are deactivated. This results in resistor R being coupled to the switch being monitored as a pull-up resistor. When the switch is normally closed, input signal TP is pulled to a voltage corresponding to a logic low state due to the drive strength of the switch being greater than that of the pull-up transistor. Then, when the switch is opened, resistor R pulls input signal TP to a voltage representing a logic high state. Input signal TP being in the logic high state causes circuitry in FIGS. 1A and 1B to drive a corresponding output signal TB1 or TB2 to a logic state to initiate additional tasks.

When the tamper detect circuitry is configured in the normally-closed-tamper-to-low configuration, transistors 402 and 403 are activated and transistors 400 and 404 are deactivated. This results in resistor R being coupled to input signal TP (and therefore the switch being monitored) as a pull-down resistor. When the switch is normally closed, input signal TP is pulled to a voltage corresponding to a logic high state. Then, when a tamper event occurs, the switch is opened which results in resistor R pulling input signal TP to a voltage representing a logic low state. Input signal TP being in the logic low state causes circuitry in FIGS. 1A and 1B to drive a corresponding output signal TB1 or TB2 to a logic state to initiate additional tasks.

With reference again to FIGS. 3A and 3B, resistor R is shown coupled to transistors 400-404. Control circuitry 406, whose inputs may be provided by a configuration register (not shown) or another source, controls the state (activation or deactivation) of transistors 400-404.

Because the normally-closed tamper configurations result in a current path existing between the high voltage reference Vcc and the low voltage reference Vss prior to the switch being opened, it may be desired to limit current consumption. Accordingly, the circuit in FIGS. 1A and 1B may include circuitry 9 for periodically or occasionally sampling the state of the switch so that this current path does not continuously exist. The sampling circuitry 9 may, for example, include timing circuitry for periodically or occasionally activating at least one of transistors 400 and 404 (instead of the transistor being continuously activated) when the tamper detect circuitry is configured in the normally-closed-tamper-to-high configuration. This periodic or occasional activation of a transistor 400 or 400 interrupts or breaks the current path between the high reference voltage Vcc and the low reference voltage Vss, thereby reducing current dissipation. Conversely, the sampling circuitry 9 may, for example, include timing circuitry for periodically or occasionally activating at least one of transistors 402 and 403 (instead of the transistor being continuously activated) when the tamper detect circuitry is configured in the normally-closed-tamper-to-low configuration. This periodic or occasional activation of a transistor 402 or 403 interrupts or breaks the current path between the high reference voltage Vcc and the low reference voltage Vss, thereby reducing current dissipation. It is understood that the sampling circuitry may interrupt the current path in other ways.

The tamper detect circuitry may also include circuitry for programmably setting the amount of resistance of resistor R to any of at least two resistance values. As stated above, resistor R may be formed from a plurality of series-connected resistors. Referring to FIG. 4, a transistor 405 may be coupled in parallel with at least one of the resistors in the string of series-connected resistors forming resistor R. Transistor 405 may be activated based upon the control signal provided to its control terminal. When transistor 405 is activated, the total resistance of resistor R is lessened so that input signal TP is pulled high or low relatively quickly. Alternatively, transistor 405 may be deactivated so that the resistance of resistor R is increased, which thereby decreases the amount of current in the above-identified current path when the tamper detect circuitry is in the normally-closed configuration. In this way, transistor 405 may be deactivated when current consumption is a concern.

Figure 7:
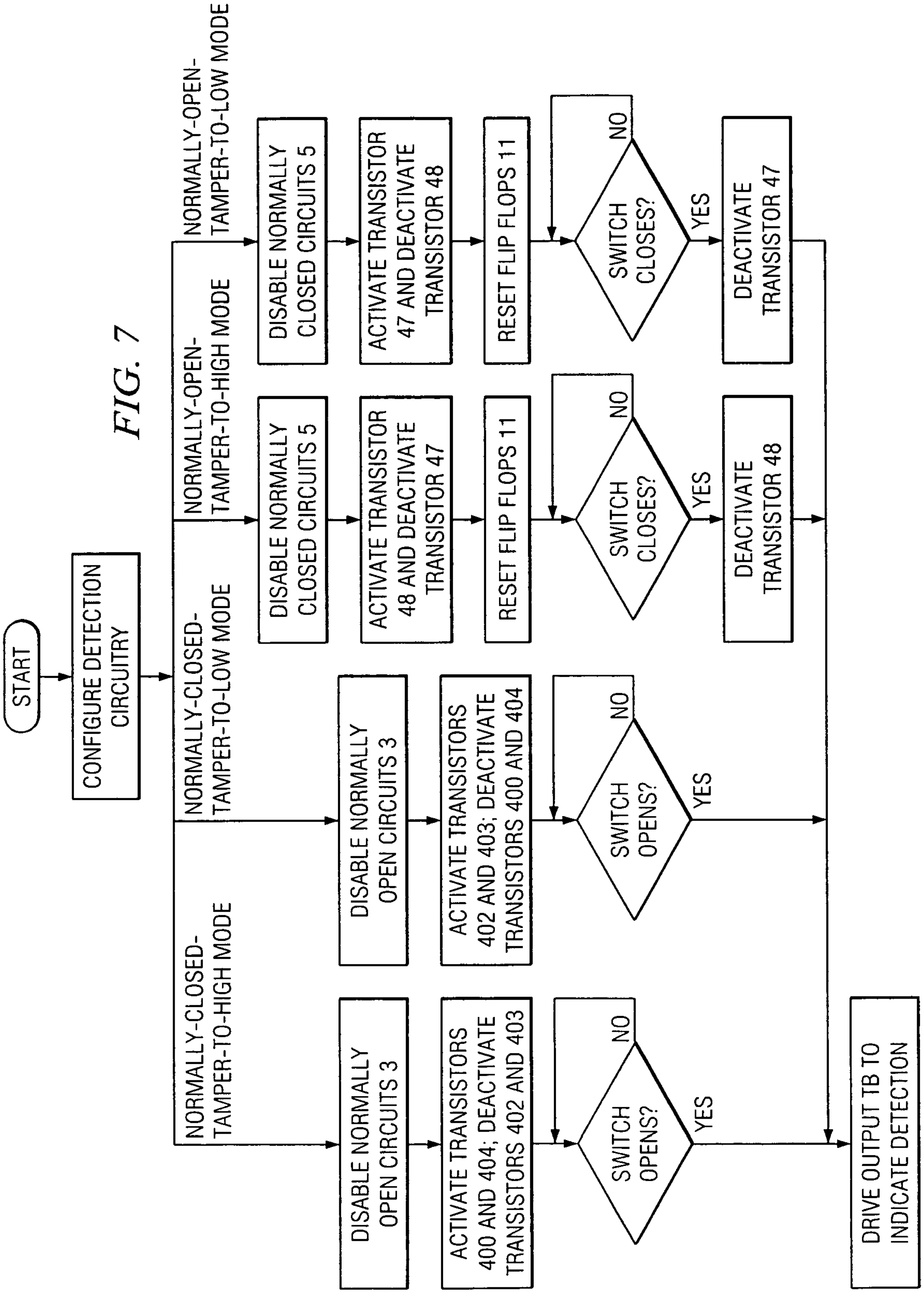
FIG. 7 is a flow chart illustrating an operation of the circuitry of FIGS. 1A and 1B.

An operation of detection circuitry will be described with reference to FIG. 7. Initially, detection circuitry is configured into one of the four possible configuration states discussed above. Configuring detection circuitry into a selected state disables the circuitry associated with the three unselected states. The step of configuring may be performed by loading the configuration register, whose outputs control circuitry in normally open circuits 3 and normally closed circuits 5.

In the event detection circuitry is configured in the normally-closed-tamper-to-high configuration, normally open circuits 3 are disabled from monitoring the switches S1 and S2 and thus do not affect the outputs TB1 and TB2. Transistors 400 and 404 are activated and transistors 402 and 403 are deactivated, which results in resistor R of each normally open circuit 5 acting as a pull-up resistor. When a switch S1 or S2 changes to the open state, such as in response to the occurrence of a tamper condition, the corresponding normally closed circuit 5 detects signal TP being pulled to the logic high state resistor R. Circuitry in normally closed circuit 5 detects node TP being pulled to the logic high state, and drives output TB to a value indicative of the detection. Output circuits 7 responsively drive the output TB1 to a value indicative of the detection of the switch being opened.

In the event detection circuitry is configured in the normally-closed-tamper-to-low state, a similar set of steps are performed as described above. However, transistors 402 and 403 are activated and transistors 404 are deactivated, resulting in the resistor R forming a pull-down resistor. Normally closed circuit 5 associated with a switch that opens detects node TP being pulled to a logic low value by resistor R, and output TB1 or TB2 is driven to a state indicative of the detection.

In the event detection circuitry is configured in the normally-open-tamper-to-high state, normally closed circuits 3 are disabled and do not perform the above-described detecting. Transistor 47 (FIGS. 2A and 2B) is activated and transistor 48 is deactivated by circuit 120 and signals Control1 and Control2. Activated transistor 47 pulls node TP (and hence the conduction terminal coupled thereto) to a logic high value. When a switch closes, such as due to the occurrence of a tamper event, node TP is pulled to a logic low value. This results in transistor 47 being deactivated and flip flop circuit 11 of circuit 100 clocking a logic high data value, which causes output TB to be in a logic high state, which thereupon causes the output of output circuits 7 to indicate the detection of the switch being closed.

In the event detection circuitry is configured in the normally-open-tamper-to-low state, normally closed circuits 3 are disabled and do not perform the above-described detecting. Transistor 48 (FIGS. 2A and 2B) is activated and transistor 47 is deactivated by circuit 120 and signals Control1 and Control2. Activated transistor 48 pulls node TP (and hence the conduction terminal coupled thereto) to a logic low value. When a switch closes, such as due to the occurrence of a tamper event, node TP is pulled to a logic high value. This results in transistor 48 being deactivated and flip flop circuit 11 of circuit 110 clocking a logic high data value, which causes output TB to be in a logic high state, which thereupon causes the output of output circuits 7 to indicate the detection of the switch being closed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A circuit for monitoring the state of at least one switch, comprising:

a monitoring circuit, coupled to a first terminal of a switch, the switch being one of a normally-open switch or a normally-closed switch, the monitoring circuit comprising:

a normally-open detection circuit having a first input coupled to the first terminal of the switch and including a first sub-circuit for detecting when the switch, if configured as a normally-open switch, closes and the first input has transitioned to a high voltage value, and further including a second sub-circuit for detecting when the switch, if configured as a normally-open switch, closes and the first input has transitioned to a low voltage value, the normally-open detection circuit generating a first signal based on the detection;

a normally-closed detection circuit having a second input also coupled to the first terminal of the switch and including a first sub-circuit for detecting when the switch, if configured as a normally-closed switch, opens and the second input has transitioned to a high voltage value, and further including a second sub-circuit for detecting when the switch, if configured as a normally-closed switch, closes and the second input has transitioned to a low voltage value, the normally-closed detection circuit generating a second signal based on the detection; and each detection circuit comprising a configuring circuit receiving a first control signal whose logic state selectively enables the normally-open detection circuit and disables the normally-closed detection circuit if the first control signal is in a first state or alternatively enables the normally-closed detection circuit and disables the normally-open detection circuit if the first control signal is in a second state, and further receiving a second control signal whose logic state selectively enables one or the other of the first and second sub-circuits based on whether input transition to the high and low voltage values, respectively, is to be detected.

2. The circuit of claim 1, wherein the normally-closed detection circuit includes a closed-to-open circuit for detecting whether the switch changes from a closed state to an open state and for pulling the first terminal of the switch to a voltage representative of one of a logic high state and a logic low state.

3. The circuit of claim 2, wherein the closed-to-open circuit is configurable for pulling the first terminal of the switch to a voltage representative of a logic high state and to a logic low state.

4. The circuit of claim 3, wherein the closed-to-open circuit comprises:

at least one resistive element;

a first transistor coupled between a first terminal of the at least one resistive element and a high reference voltage source;

a second transistor coupled between the first terminal of the at least one resistive element and the first terminal of the switch;

a third transistor coupled between a second terminal of the at least one resistive element and a low reference voltage source; and a fourth transistor coupled between the second terminal of the at least one resistive element and the first terminal of the switch.

5. The circuit of claim 4, wherein the configuring circuit comprises control circuitry for activating the first transistor and the third transistor at substantially the same time, or activating the second transistor and the fourth transistor at substantially the same time.

6. The circuit of claim 5, wherein the control circuitry comprises a register.

7. The circuit of claim 5, wherein the configuring circuit comprises control circuitry for selectively activating one of the first transistor and the third transistor while occasionally activating the other of the first and third transistors, or for selectively activating one of the second transistor and the fourth transistor while occasionally activating the other of the second and fourth transistors.

8. The circuit of claim 1, wherein the normally-open detection circuit includes a open-to-closed circuit for detecting whether the switch changes from an open state to a closed state and for relatively weakly pulling the first terminal of the switch towards a voltage representative of one of a logic high state and a logic low state.

9. The circuit of claim 8, wherein the open-to-closed circuit is configurable for pulling the first terminal of the switch to a voltage representative of a logic high state and to a logic low state.

10. The circuit of claim 9, wherein the open-to-closed circuit comprises at least one first transistor coupled between a high reference voltage level and the first terminal of the switch, at least one second transistor coupled between a low reference voltage level and the first terminal of the switch, and control logic for generating at least one control signal having a value indicative of a configuration of the open-to-closed circuit, a control terminal of each of the at least one first transistor and the at least one second transistor having a value based upon the value of the at least one control signal.

11. The circuit of claim 10, wherein the open-to-closed circuit comprises a first detection circuit having an input coupled to the first terminal of the switch and an output coupled to a control terminal of the at least one first transistor, the at least one control signal being coupled to an input of the first detection circuit, the output of the first detection circuit having a value indicative of the first detection circuit detecting the first terminal of the switch being pulled to a voltage representative of a logic low level.

12. The circuit of claim 11, wherein the first detection circuit comprises a logic gate with hysteresis.

13. The circuit of claim 11, wherein the open-to-closed circuit further comprises a second detection circuit having an input coupled to the first terminal of the switch and an output coupled to a control terminal of the at least one second transistor, the at least one control signal being coupled to an input of the second detection circuit, the output of the second detection circuit having a value indicative of the second detection circuit detecting the first terminal of the switch being pulled to a voltage representative of a logic high value.

14. The circuit of claim 13, wherein the open-to-closed circuit further comprises an output circuit having a first input coupled to the output of the first detection circuit, a second input coupled to the output of the second detection circuit, and an output having a value representative of one of the first and second detection circuits detecting the switch being closed.

15. A system, comprising:

a switch having a first conduction terminal and a second conduction terminal, the switch being one of a normally-open switch or a normally-closed switch;

a first circuit coupled to the first conduction terminal of the switch for detecting the switch opening and generating if activated a signal indicative of that detection;

a second circuit coupled to the first conduction terminal of the switch for detecting the switch closing and generating if activated a signal indicative of that detection;

a third circuit coupled to the first circuit and the second circuit for configuring the first and second circuits by activating the first circuit and deactivating the second circuit if the switch is a normally-closed switch and deactivating the first circuit and activating the second circuit if the switch is a normally-open switch, wherein the first circuit comprises:

at least one resistive element;

a first transistor coupled between a first terminal of the at least one resistive element and a high reference voltage source;

a second transistor coupled between the first terminal of the at least one resistive element and the first conduction terminal of the switch;

a third transistor coupled between a second terminal of the at least one resistive element and a low reference voltage source; and a fourth transistor coupled between the first conduction terminal of the switch and the second terminal of the at least one resistive element.

16. The system of claim 15, wherein the activated first/second circuit is configurable to one of: selectively pull the first conduction terminal of the switch towards a voltage level representative of a logic high state, or selectively pull the first conduction terminal of the switch towards a voltage level representative of a logic low state.

17. The system of claim 16, wherein the activated circuit selectively weakly pulls the first terminal of the switch towards a certain logic state, relative to a drive strength of the switch to pull the first terminal thereof towards a different logic state.

18. The system of claim 15, wherein the first circuit further comprises control circuitry for selectively activating the first and third transistors at substantially the same time, and selectively activating the second and fourth transistors at substantially the same time.

19. The system of claim 15, wherein the first circuit further comprises control circuitry for selectively activating one of the first and third transistors while occasionally activating the other of the first and third transistors, and for selectively activating one of the second and fourth transistors while occasionally activating the other of the second and fourth transistors.

20. A circuit for monitoring the state of at least one switch, the switch being one of a normally-open switch or a normally-closed switch, the monitoring circuit comprising:

a normally-open detection circuit having a first input coupled to receive a signal from the switch for detecting when the switch, if configured as a normally-open switch, closes and generating a first signal based on the detection, the normally-open detection circuit further including an enable circuit responsive to a received first enable signal for selectively enabling operation of the normally-open detection circuit;

a normally-closed detection circuit having a second input also coupled to received the same signal from the switch for detecting when the switch, if configured as a normally-closed switch, opens and generating a second signal based on the detection, the normally-closed detection circuit further including an enable circuit responsive to a received second enable signal for selectively enabling operation of the normally-closed detection circuit; and a control circuit responsive to a control signal for generating the first and second enable signals to have opposite logic states so as to enable the normally-open detection circuit and disable the normally-closed detection circuit if the switch is configured as a normally-open switch and alternatively enable the normally-closed detection circuit and disable the normally-open detection circuit if the switch is configured as a normally-closed switch.

21. The circuit of claim 20:

wherein the normally-open detection circuit further includes:

a first sub-circuit for detecting a transition of the first input to a low voltage value as an indication that the switch, if configured as a normally-closed switch, has closed; and a second sub-circuit for detecting a transition of the first input to a high voltage value as an indication that the switch, if configured as a normally-closed switch, has closed;

wherein the normally-closed detection circuit further includes:

a first sub-circuit for detecting a transition of the first input to a low voltage value as an indication that the switch, if configured as a normally-closed switch, has closed; and a second sub-circuit for detecting a transition of the first input to a high voltage value as an indication that the switch, if configured as a normally-closed switch, has closed; and wherein the control circuit is further responsive to a second control signal whose logic state to selectively enable one or the other of the first and second sub-circuits based on whether transition to the high and low voltage values, respectively, is to be detected.

* * * * *

UNITED STATES PATENT AND TRADEMARK OFFICE

CERTIFICATE OF CORRECTION

PATENT NO. : 7,358,628 B2
APPLICATION NO. : 10/717103
DATED : April 15, 2008
INVENTOR(S) : Rong Yin It is certified that error appears in the above-identified patent and that said Letters Patent is hereby corrected as shown below:

In the Specification:

At column 2, line number 43, please add the word -- FIGS. -- before 1A and 1B.

At column 3, line number 39, please delete the word “is”.

At column 6, line number 32, please replace the words [3A and B] with the words -- 3A and 3B --.

Signed and Sealed this
Sixteenth Day of August, 2011

David J. Kappos
*Director of the United States Patent and Trademark Office*